(12) United States Patent
Yamaguchi

(10) Patent No.: US 6,779,419 B2
(45) Date of Patent: Aug. 24, 2004

(54) LINEAR MOTION GUIDE BEARING DEVICE AND BALL SCREW DEVICE

(75) Inventor: Hiroki Yamaguchi, Gunma (JP)

(73) Assignee: NSK Ltd., Tokyo (JP)

(*) Notice: Subject to any disclaimer, the term of this patent is extended or adjusted under 35 U.S.C. 154(b) by 0 days.

(21) Appl. No.: 10/143,978

(22) Filed: May 14, 2002

(65) Prior Publication Data

US 2002/0178852 A1 Dec. 5, 2002

(30) Foreign Application Priority Data

May 15, 2001 (JP) .................................. P.2001-144783

(51) Int. Cl.[7] .............................................. F16H 1/18
(52) U.S. Cl. ...................................... 74/424.88; 384/51
(58) Field of Search .......................... 74/424.88; 384/51, 384/520, 521, 45, 47, 48, 49

(56) References Cited

U.S. PATENT DOCUMENTS

| 5,927,858 A | 7/1999 | Agari |
| 6,113,274 A | * 9/2000 | Horimoto .................... 384/43 |
| 6,415,676 B1 | * 7/2002 | Takagi et al. ............ 74/424.88 |

FOREIGN PATENT DOCUMENTS

JP        10-281154        10/1998

OTHER PUBLICATIONS

Patent Abstracts of Japan, vol. 2000, No. 09 Oct. 13, 2000.
Patent Abstracts of Japan, vol. 2000, No. 03, Mar. 30, 2000.

* cited by examiner

Primary Examiner—David Fenstermacher
(74) Attorney, Agent, or Firm—Sughrue Mion, PLLC (57) ABSTRACT

A rolling element series is formed with a plurality of spherical rolling elements and four kinds of retainer pieces. The element-to-element thicknesses TA, TB, TC, and TD of the retainer pieces are different: $T_A > T_B > T_C > T_D$.

10 Claims, 9 Drawing Sheets

LINEAR MOTION GUIDE BEARING DEVICE AND BALL SCREW DEVICE

BACKGROUND OF THE INVENTION

The present invention relates to a linear motion device used in, for example, the machine tool. More particularly, the present invention relates to a linear motion guide bearing device in which retainer pieces are each interposed between adjacent rolling elements which circulatingly roll in the longitudinal direction of a guide rail. In addition, the present invention relates to a ball screw device in which retainer pieces are each interposed between adjacent rolling elements which circulatingly roll along an element rolling groove, spirally shaped, defined by a thread groove of a ball screw shaft and a thread groove of a nut.

The present invention relates to retainer pieces each disposed between adjacent balls in order to secure good operation of a ball screw. In this specification, the term "the thickness of the retainer piece" or the "thickness" on the retainer piece does not means the thickness of the whole retainer piece, but means the thickness of the retainer piece to separate the surface of a ball from the surface of another ball adjacent to the former. To be more precise, the "thickness" on the retainer piece means that the thickness of the retainer piece at a position with respect to a position defined a line connected centers of adjacent rolling elements, when two rolling elements are arranged on a collinear.

Figure 9:
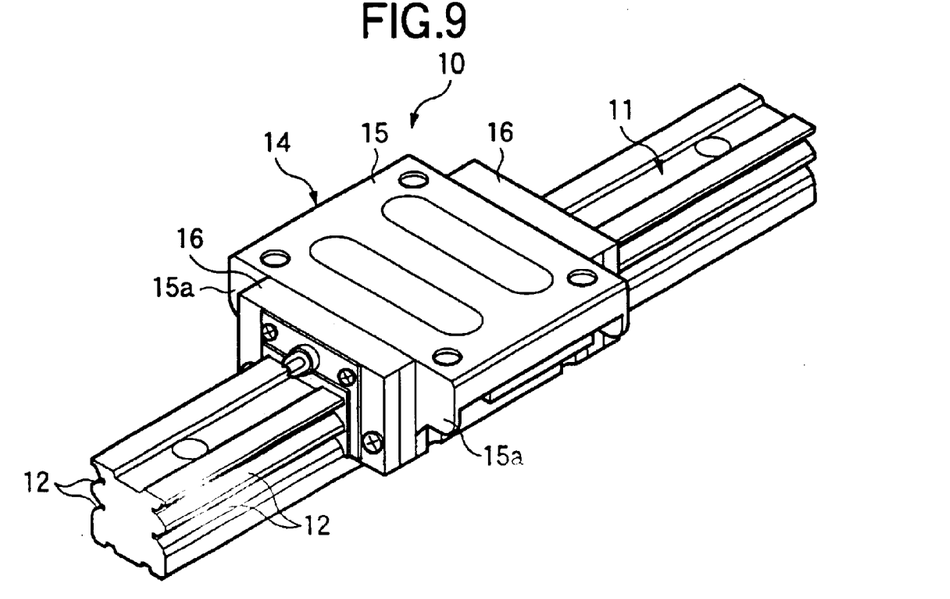
FIG. 9 is a perspective view showing an overall construction of a linear motion guide bearing device.
Figure 10:
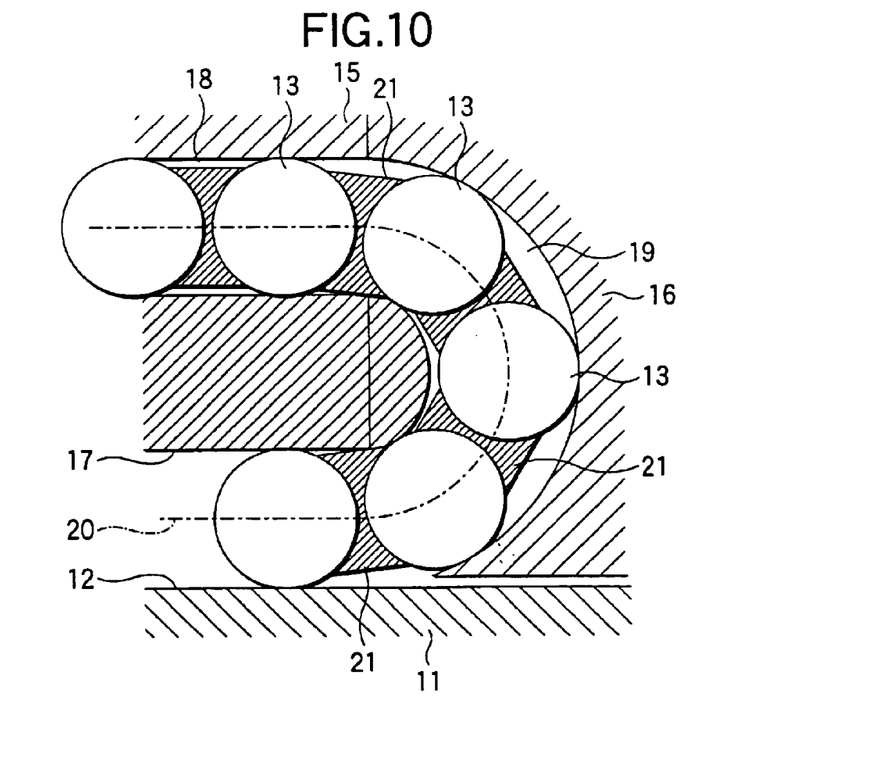
FIG. 10 is an explanatory diagram for explaining related retainer pieces.

A linear motion guide bearing device 10 as shown in FIG. 9 is known for a device for linearly guiding a work table of, for example, a machine tool. The linear motion guide bearing device 10 is provided with a guide rail 11 being rectangular in cross section. Rolling grooves 12 for the rolling elements are formed on both side surfaces of the guide rail 11, and from one end to the other end of the guide rail 11. A plurality of spherical rolling elements 13 (see FIG. 10) are engaged with each other in the rolling grooves 12. When the rolling elements 13 roll along the rolling element grooves 12, a slider 14 is relatively moved in the longitudinal direction of the guide rail 11.

In the slider 14 have a slider body 15 straddling the guide rail 11, and end caps 16 provided at the front end and the rear end of the slider body 15. Rolling grooves 17 for the rolling elements (see FIG. 10) are arcuate in cross section and are formed in the inner side walls of the each of sleeves 15a of the slider body 15 of the slider 14, respectively. The spherical rolling elements 13 roll in and along a rolling-element passage which is formed between the rolling grooves 17 and the rolling grooves 12.

A passage hole for the rolling elements 18 is provided within each of the sleeves 15a of the slider body 15 and extends parallel to the rolling grooves 17. The rolling grooves 17 and the passage holes 18 form an endless circulating raceway 20 of the rolling elements 13 together with rolling-element return passages 19 formed in the end caps 16.

Figure 11:
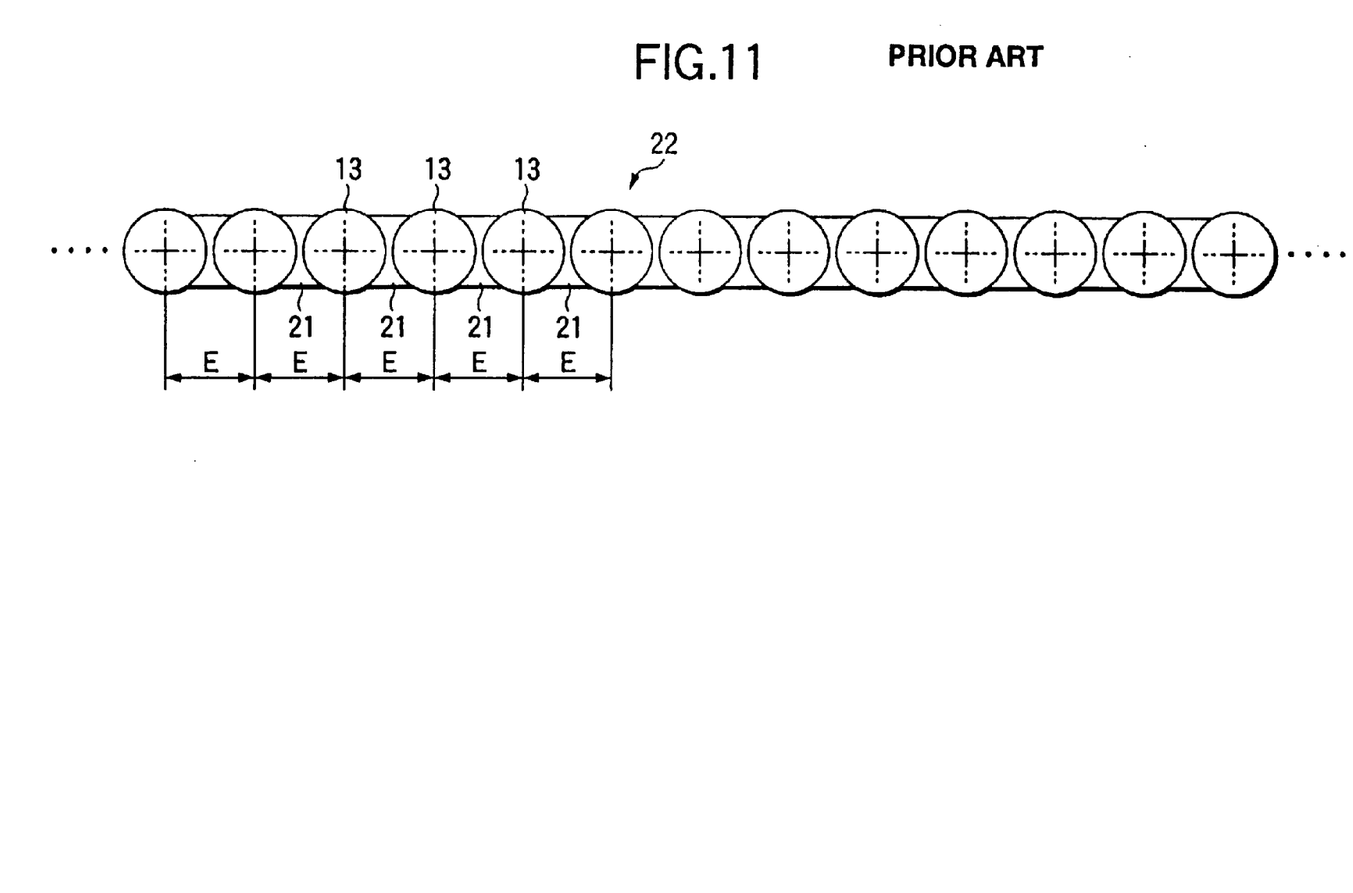
FIG. 11 is a diagram showing a rolling element series consisting of related retainer pieces.

In the linear motion guide bearing device, when the rolling elements forcibly rub with each other with the movement of the slider 14, early wear of the rolling elements and generating noise are frequently caused. To avoid this, retainer pieces 21 are each interposed between adjacent rolling elements 13, thereby preventing the rolling elements from coming in contact with one another. In the linear motion guide bearing device, as shown in FIG. 11, the pitches among the rolling elements of a rolling element series 22 which is constructed with spherical rolling elements 13 and the retainer pieces 21 are equal in dimension. Accordingly, the periodical passing vibration of the rolling elements occurs at a fixed period with the movement of the slider 14. The periodical passing vibration vibrates the bearing. This makes it difficult to further enhance the noise characteristic and motion accuracy. The same thing is correspondingly applied to the screw device in which the retainer pieces are each interposed between adjacent rolling elements.

In Japanese patent application No. Hei. 9-100839 (U.S. Pat. No. 5,927,858 (Jul. 27, 1999), a linear motion guide bearing device in which thereby eliminating the presence of indentations on the raceway surface on which the rolling elements 13 roll, or reducing the vibrations and noises, which are due to the fact that the rolling elements 13 on the element endless circulating raceways simultaneously enter the load path is described.

In the linear motion guide bearing device disclosed, the retainer pieces, which are each interposed between adjacent rolling elements in the rolling element series, are all different in their pieces having different thicknesses must be prepared. This brings about cost increase in the manufacturing of the retainer pieces and assembling of them into between the adjacent rolling elements.

In a ball screw device, balls(rolling elements) are arranged in the ball screw to support a load. Those balls roll in a circulating manner, and through the ball rolling, a good rotation-to-linear motion conversion is secured while maintaining load capacity and rigidity. Since the rolling of the balls occurs randomly, sometimes adjacent balls act to mutually impart compression forces to each other, and the slipping state often occurs. As a result, the balls exhibit great resistance to impede the rolling of other balls, so that a torque variation occurs and causes operation trouble.

A ball screw is known which, to solve such a problem, retainer pieces are each disposed between adjacent balls, and resistance acting to impede the rolling of other balls is not generated by avoiding the mutual ball contact.

In the ball screw, the balls are arranged at substantially regular spatial intervals by use of the retainer pieces, and the following new problems arise.

Figure 12:
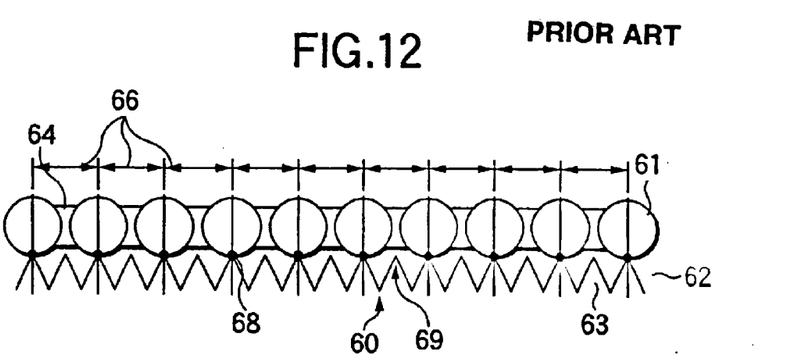
FIG. 12 is a diagram showing, in model form, a relationship among a process-waving, balls, retainer pieces in a related ball screw, and showing a state that the pitch of process-waving is coincident in length with the ball-to-ball distance.

1) As shown in FIG. 12, when the surface 62 of the shaft on which balls 61 are disposed or the groove surface of the nut, which surface is brought into contact with the balls 61, is ground, very fine process-waving 63 caused by the oscillation of a grinding wheel inevitably takes place on the contacting surface. This is a phenomenon always occurring in machining objects as well as in the ball screw. This fact implies that even if an object is highly precisely machined and the precision of the machined object is visually (macroscopically) high, the very fine process-waving occurs when microscopically observed. In this state, retainer pieces 64 having thicknesses being uniform in value are disposed in the ball screw. As a result, there is a case that a distance 66 between adjacent balls of those regularly arranged balls is coincident or substantially coincident in length with the pitch of the process-waving. If those are coincident, the number of contact positions 68 where the balls come in contact with top parts of the fine process-waving is equal to the number of the balls as the greatest number. Also when the distance is coincident with the bottom parts of the fine process-waving, the number of contact positions is equal to the number of the balls as the greatest number. The influence by the variation of friction acts by the number of balls. This possibly leads to operation impairment due to the friction variation, and abnormal sound generation and noise increase, which result from the coincidence of the balls 61 with the process-waving 63.

2) Where in the ball screw utilizing the retainer pieces 64, one kind of retainer pieces is used and the machining accuracy is not different, to avoid the problem 1) above arising from the coincidence of the ball(element)-to-ball (element) distance between the balls with the pitch of the process-waving 63, consideration at design or machining stage is needed, so that the pitch of the very fine process-waving 63 is not coincident with the ball-to-ball distance. In other words, consideration on a microscopic condition of the surface produced by the machining is an essential matter in design and machining. This is very difficult and needs complicated work.

Figure 13:
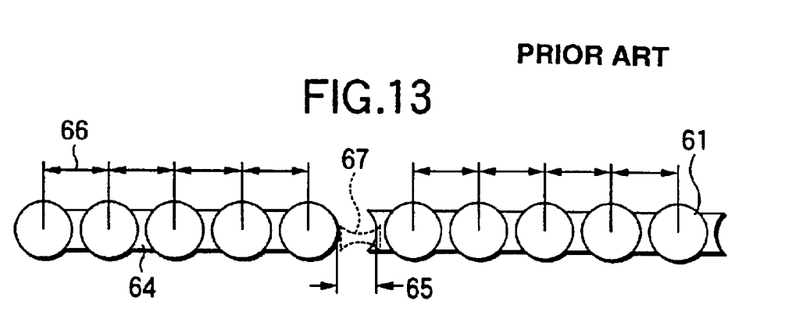
FIG. 13 is a diagram showing, in model form, a relationship among a process-waving, balls, retainer pieces in the related ball screw, and showing a state that the ball-to-ball distance is improper.

3) Also in controlling, in design, the number of balls 61 and the number (referred to as a filling factor) of the retainer pieces 64 to a length (referred to as a circuit length) of a space in which the balls 61 are put, in the case of using one kind of retainer pieces 64, balls 61 are arranged at regular intervals 66 as shown in FIG. 13. As a result, a space 65 having a size being incapable of receiving a new ball 1 is left sometimes. If such a space is present, there is a chance that the retainer piece (indicated by a wavy line 67 in the figure) falls when the balls 61 roll.

SUMMARY OF THE INVENTION

Accordingly, an object of the present invention is to provide a linear motion device such as a linear motion guide bearing device and a ball screw, which reduce the vibrations and noises, which are ascribed to the periodical passing vibration of rolling elements, without increasing the manufacturing cost.

To achieve the above object, a first aspect of the present invention provides a linear motion guide bearing device comprising: a guide rail having rolling grooves extending in an axial direction of the linear motion guide bearing device and formed on the outer surface thereof; a slider engaged with the guide rail so as to move in the axial direction of the guide rail; a plurality of rolling elements interposed between the slider and the rolling grooves of the guide rail; and a plurality of retainer pieces each interposed between adjacent rolling elements, the retainer pieces including a plurality kinds of retainer pieces having different thicknesses, and the number of kinds of the retainer pieces is smaller than the number of the rolling elements of the rolling element series.

In addition to this, a second aspect of the present invention provides a ball screw device comprising: a screw shaft having a first thread groove spirally formed in an outer peripheral surface thereof; a nut having a second thread groove in the inner peripheral surface thereof and being fitted to the screw shaft, the second thread groove corresponding to the first thread groove of the screw shaft; a plurality of rolling elements rollably received in a space defined between the first and second thread grooves; a circulating member fixed to the nut so as to form a circulating passage through which the rolling elements rolling along the space defined between the first and second thread grooves endlessly circulate; and a plurality of retainer pieces each interposed between adjacent rolling elements, the retainer pieces including a plurality kinds of retainer pieces having different thicknesses, and the number of kinds of the retainer pieces are smaller than the number of the rolling elements of the rolling element series.

With such a mechanical arrangement, there is no need of preparing a plurality of different kinds of retainer pieces having different thicknesses. Therefore, the linear motion device is capable of reducing the vibrations and noises, which are ascribed to the periodical passing vibration of the rolling elements, without increasing the cost.

In this case, when the preparation of retainer pieces and the assembling of the retainer pieces to between the rolling elements are allowed for, it is preferable that the retainer pieces are two to five number of kinds of retainer pieces. If the number of retainer pieces is so selected, the retainer pieces preparation is well balanced with the retainer pieces assembling. When the rolling element series is formed using different kinds of retainer pieces having different thicknesses, it is preferable that every kinds of retainer pieces having different thicknesses are sorted by colors, and each retainer piece has an identifying mark every kind of retainer piece. This feature accrues to the following advantages. It is prevented that the retainer pieces are each assembled to between adjacent rolling elements erroneously. The management and discrimination of the retainer pieces are easy.

Some significant difference must be allowed to be present in the element-to-element pitches among the different kinds of retainer pieces. When allowing for the durability of the retainer pieces, the dimension of the radius of curvature of the circulating raceway, and the minimizing of the load capacitance, the significant difference of the element-to-element pitches is preferably 1% to 10% of the diameter of the rolling element.

Further it is preferred that the retainer pieces have each an elastic structure or are each made of elastic material.

It is preferred that a method of controlling a distance of the center-to-center distance between the adjacent balls or the number of the balls by making different the thicknesses of the retainer pieces each located between the adjacent balls.

1) In reference to FIGS. 12 and 13, even in a case where the pitch of the process-waving 63 is coincident with the distance between adjacent balls 61 (the ball-to-ball distance), the ball-to-ball distance may easily be changed by arranging retainer pieces 64 having different thicknesses (at least two kinds of retainer pieces). As a result, the pitch of the process-waving 63 is not coincident in length with the ball-to-ball distance. Accordingly, the ball screw of the present invention is free from the synergy based on the number of balls, which results from the non-coincidence of the pitch of the process-waving 63 with the ball-to-ball distance, and succeeds in solving the operation impairment and noise problem, when comparing with the case where the ball-to-ball distance cannot be changed.

2) Freedom of selection of the retainer pieces 64 is large. Accordingly, after the ball-to-ball distance is incorporated into a design condition, there is no need of considering the process-waving 63 and the ball pitch in the stage of design or machining. Design or machining work is lessened leading to labor saving.

3) Freedom of selecting the thicknesses of the retainer pieces 64 is large. Accordingly, the filling factor of balls is easily controlled by changing the retainer pieces 64. With this, in the initial stage of design, design work may proceed without taking the circuit length and the filling factor into consideration.

In addition to the above-mentioned effects, the following effects may also be produced.

4) Since the freedom of selection of retainer pieces is large, the secondary effect allowing a designer to select the retainer piece having such a thickness as to reject its coincident with the pitch of the process-waving is produced in addition to the feature of the present invention that the retainer pieces to be arranged are not uniform in thickness value.

BRIEF DESCRIPTION OF THE DRAWINGS

FIGS. 7A and 7B are model diagram showing the surface of a ball screw for determining the retainer pieces in the embodiment: FIG. 7A showing the case of the embodiment, and FIG. 7B showing a related case;

FIGS. 8A and 8B are model diagram showing a relationship between a retainer piece and balls: FIG. 8A showing related retainer piece and FIG. 8B showing a case where elastic property is given to the retainer piece;

DESCRIPTION OF THE PREFERRED EMBODIMENTS

The preferred embodiments of the present invention will be described with reference to the accompanying drawings, wherein reference numerals being equivalent to portions in FIGS. 9 to 13 are used.

Figure 1:
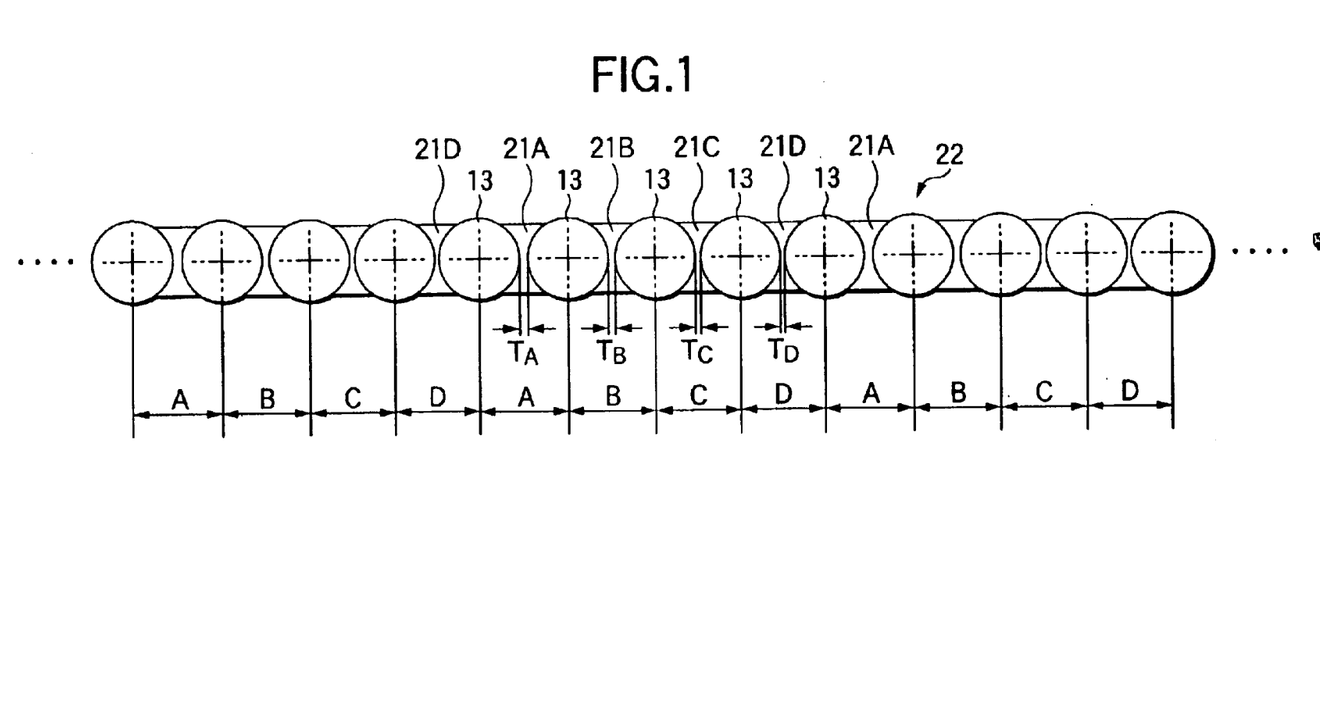
FIG. 1 is a diagram showing a rolling element series formed by using four kinds of retainer pieces having element-to-element thicknesses each between adjacent rolling elements.

A first embodiment of a linear motion guide bearing device according to the present invention is shown in FIG. 1. In the figure, reference numerals 21A, 21B, 21C, and 21D indicate retainer pieces each located between adjacent rolling elements 13. Those retainer pieces 21A to 21D are designed such that their thicknesses $T_A$, $T_B$, $T_C$, and $T_D$ each measured between adjacent rolling elements are different as follows: $T_A > T_B > T_C > T_D$. Therefore, pitches among rolling elements of a rolling element series 22 consisting of the retainer pieces 21A to 21D and the rolling elements 13 are given by A>B>C>D where A is a distance measured between two spherical rolling elements 13, inclusive of the retainer piece 21A, B is a distance measured between two spherical rolling elements 13, inclusive of the retainer piece 21B, C is a distance measured between two spherical rolling elements 13, inclusive of the retainer piece 21C, and D is a distance measured between two spherical rolling elements 13, inclusive of the retainer piece 21D.

The retainer pieces 21A to 21D are manufactured to have different thicknesses $T_A$, $T_B$, $T_C$, and $T_D$ so as to satisfy the following relations:

$$A-B=0.035 \times Da$$

$$B-C=0.025 \times Da$$

$$C-D=0.015 \times Da$$

where A: distance measured between two spherical rolling elements 13, inclusive of the retainer piece 21A B: distance measured between two spherical rolling elements 13, inclusive of the retainer piece 21B C: distance measured between two spherical rolling elements 13, inclusive of the retainer piece 21C D: distance measured between two spherical rolling elements 13, inclusive of the retainer piece 21D Da: diameter of the spherical rolling element 13.

Further, those retainer pieces 21A to 21D are colored every kind of retainer piece: for example, the retainer piece 21A is colored red; the retainer piece 21B is colored blue; the retainer piece 21C is colored yellow; and the retainer piece 21D is colored white.

Figure 2:
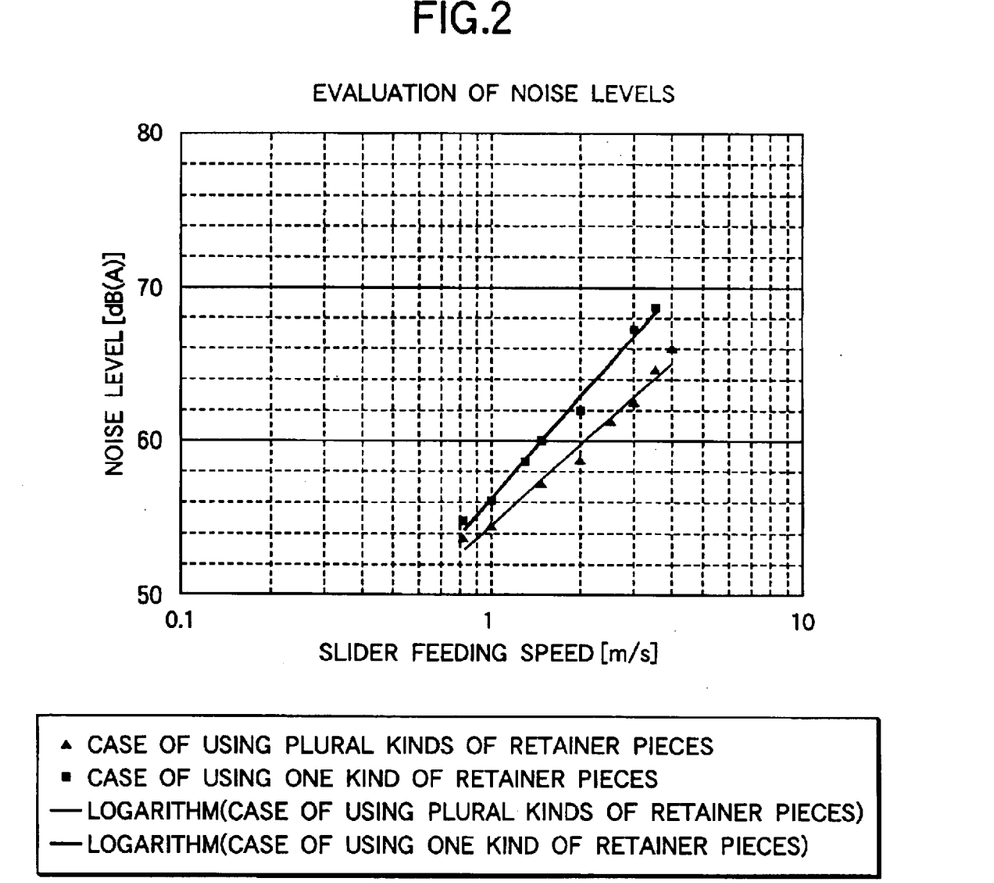
FIG. 2 is a graph showing noise levels of a linear motion guide bearing device whose rolling element series consists of four kinds of retainer pieces and a linear motion guide bearing device whose rolling element series consists of one kind of rolling elements.

Noise levels of a linear motion guide bearing device whose rolling element series consists of four kinds of retainer pieces 21A to 21D and a linear motion guide bearing device whose rolling element series consists of one kind of retainer pieces were measured respectively, and the result of the measurements are shown in FIG. 2. In the figure, marks ▲ indicate noise levels in the case where the rolling element series consists of four kinds of retainer pieces 21A to 21D, and marks ■ indicate noise levels in the case where the rolling element series consists of one kind of retainer pieces. In the figure, the abscissa represents a feeding speed (m/s) of the slider, and the ordinate represents noise levels (dB).

As seen from FIG. 2, in the case where the rolling element series consists of four kinds of retainer pieces 21A to 21D, the noise level is lower than the noise level in the case where the rolling element series consists of one kind of retainer pieces. The reason for this may be considered as follows. Where four kinds of retainer pieces 21A to 21D having different thicknesses $T_A$, $T_B$, $T_C$, and $T_D$ are used, the element-to-element pitches of the rolling element series 22 are not uniform. As a result, the periodical passing vibration of the rolling element having due to rolling motion of the rolling elements 13, is reduced.

Accordingly, the vibration and noise, which are ascribed to the periodical passing vibration of the rolling elements maybe reduced without making all the element-to-element pitches of the rolling element series different. Therefore, there is no need of using many kinds of retainer pieces having different element-to-element thicknesses. Accordingly, the periodical passing vibration due to rolling motion of the spherical rolling elements is reduced.

In this embodiment, the retainer pieces 21A to 21D, each interposed between adjacent rolling elements, are sorted by different colors every kind of retainer pieces. Accordingly, the retainer pieces having different thicknesses may readily be discriminated. It is prevented that the retainer pieces are each assembled to between adjacent rolling elements erroneously. The management and discrimination of the retainer pieces are easy.

In the above-mentioned embodiment, the rolling element series is formed by assembling each of individual retainer pieces to between adjacent rolling elements. In alternative, a series of rolling elements formed by connected retainer pieces each other one after another may be used to form the rolling element series. In the above-mentioned embodiment, the rolling element series 22 is formed by assembling the four kinds of retainer pieces 21A to 21D to between adjacent spherical rolling elements 13 regularly. If required, the four kinds of retainer pieces 21A to 21D maybe assembled to between adjacent rolling elements 13 irregularly, for the same purpose. In this way, the periodical passing vibration of the rolling elements due to rolling motion of the rolling elements, is further reduced.

In the embodiment mentioned above, the rolling element series 22 is formed by using four kinds of retainer pieces 21A to 21D which are substantially equal in number. The rolling element series 22 may also be formed by using those kinds of retainer pieces which are different in number, for example, two pieces of retainer pieces 21A, four pieces of retainer pieces 21b, eight pieces of retainer pieces 21C, and eight pieces of retainer pieces 21D. Further, in the embodiment, the retainer pieces 21A to 21D are sorted by colors. Those retainer pieces 21A to 21D may be marked with colored identifying marks, respectively. The identifying marks may be symbols and so on. The following method may be used for assembling the retainer pieces to between the rolling elements. The numbers of those kinds of retainer pieces necessary for forming one rolling element series are extracted (e.g., $X_1$ is a plurality of retainer pieces 21A, $X_2$ is a plurality of retainer pieces 21B, $X_3$ is a plurality of retainer pieces 21C, and $X_4$ number of retainer pieces 21D), and then those are put in a container and agitated to thereby array retainer pieces randomly.

In the embodiment, to give a significant difference to the pitches among the rolling elements of the rolling element series containing the retainer pieces 21A to 21D, the following pitch conditions are set up:

$A>B>C>D$, $A-B=0.035 \times Da$, $B-C=0.025 \times Da$, $C-D=0.015 \times Da$.

If required, the pitches may be conditioned as $A-B=B-C=C-D=0.035 \times D_A$. While the present invention has been described using the linear motion guide bearing device, it is evident that the present invention may be applied to a screw device.

Figure 4:
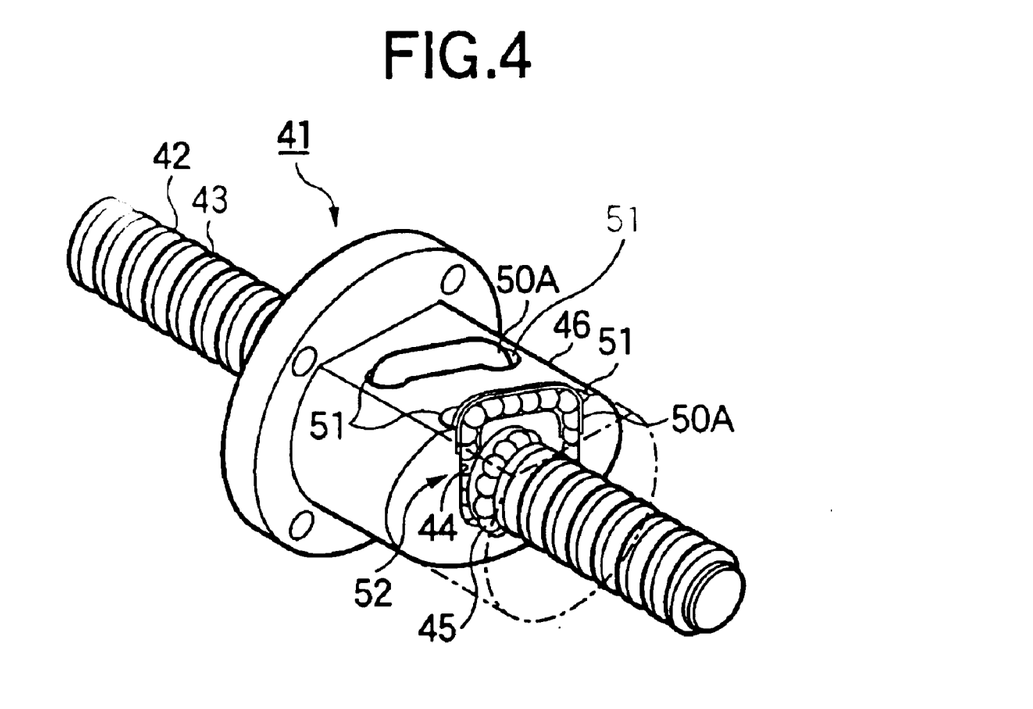
FIG. 4 is a perspective view, partially broken, showing the ball screw device.

A ball screw device as one form of a screw device is shown in FIG. 4. In the ball screw device 41, a ball nut 46 having a spiral thread groove 44 formed in the inner peripheral surface thereof is loosely fit to a screw shaft 43 having a spiral thread groove 42 in the outer peripheral surface thereof and extending in the axial direction.

The spiral thread groove 44 of the ball nut 46 are disposed facing the thread groove 42 of the screw shaft 43 so as to form a spiral passage therebetween. A plurality of balls 45 as rolling elements are rollably put in the spiral passage. The ball nut 46 linearly moves through the rolling of the balls 45 by rotation of the screw shaft 43.

The ball nut 46 linearly moves while the balls 45 roll along the circulating passage formed by both of the thread grooves 42 and 44. To continuously move the ball nut 46, it is necessary to circulate the balls 45 endlessly.

For this purpose, a part of the outer peripheral surface of the ball nut 46 is flattened, and a couple of holes 51 communicating with both the thread screws 42 and 44 are formed in the flat part of the ball nut 46 so as to straddle the screw shaft 43. Both ends of a U-shaped ball tube 50A as a ball circulating member are fit into the holes 51, thereby forming a ball circulating passage 52. Circulation piece, end cap and others maybe used for forming the circulating path, in addition to the ball tube.

Figure 3:
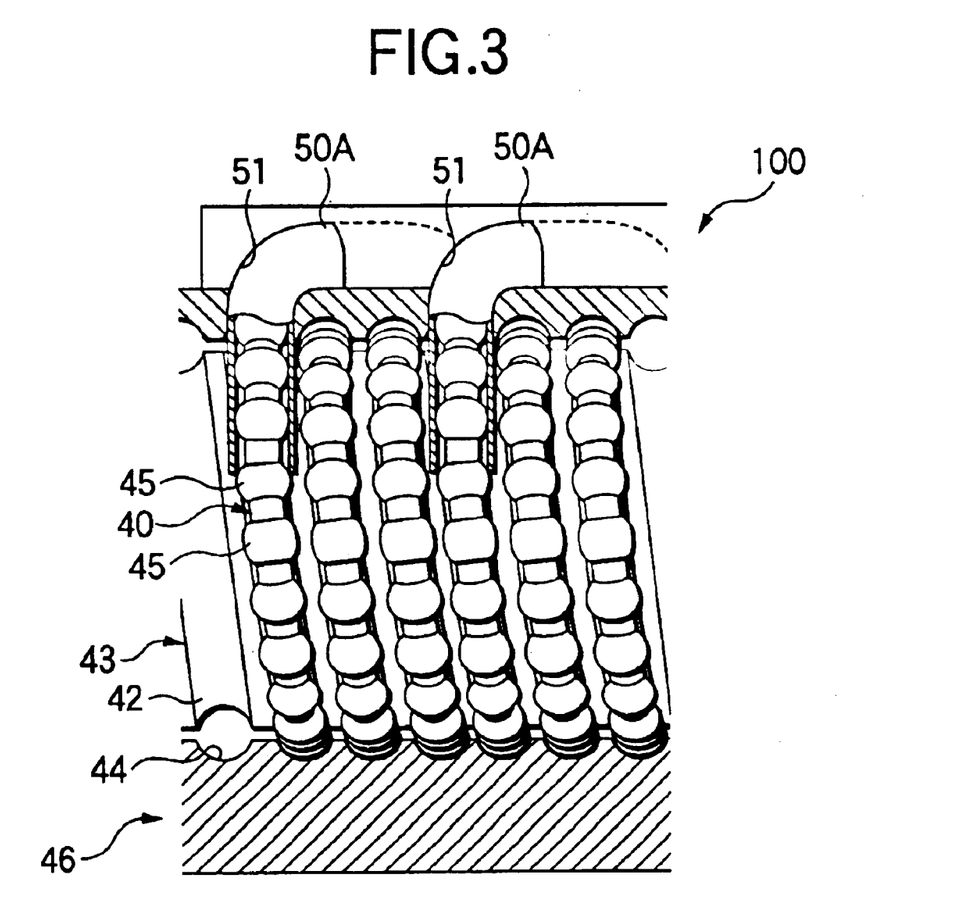
FIG. 3 is a sectional view showing a key portion of a ball screw device which is an embodiment of the present invention.

The ball screw device 100, as shown in FIG. 3, retainer pieces 40 are each interposed between adjacent balls 45 of a plurality of balls 45. The number of balls 45 are rollably put in a spiral passage defined between a thread groove 44 of a ball nut 46 and a thread groove 42 of a screw shaft 43. The retainer pieces 40 are each cylindrical or columnar, and both ends of the retainer piece are each concave shape corresponding in a shape of the ball 45.

Figure 5:
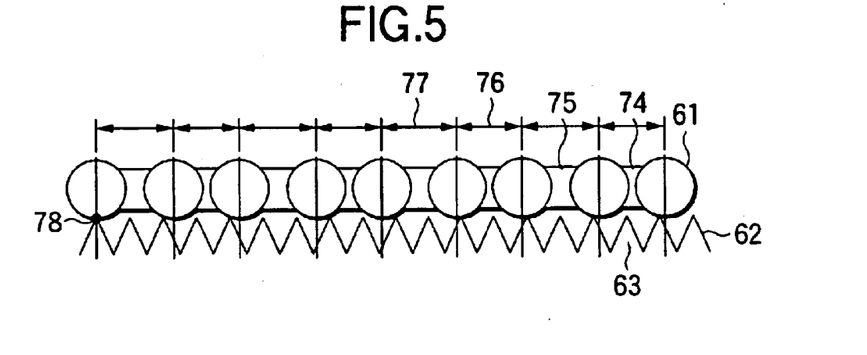
FIG. 5 is a diagram showing, in model form, an embodiment of the present invention having the most advantageous feature, which the embodiment is a ball screw in which retainer pieces having different thicknesses are partially applied.

An another embodiments of the retainer pieces of the present invention will be described with reference to FIGS. 5 to 8B. As shown in FIG. 5, balls 61 are put on a process-waving 63 on a surface 62. (The process-waving is exaggeratedly illustrated in the figures.) Retainer pieces 74 and 75 being different in thickness are alternately interposed between adjacent balls. With this construction, the ball-to-ball distances 76 and 77 are alternately and repeatedly arranged, as shown. As seen from comparison with the construction of FIG. 12 showing the related art, even when the pitch of the process-waving 63 is coincident in length with the ball-to-ball distance in the related art, in the case that the retainer pieces 74 and 75 having different thicknesses are alternately arranged as in the embodiment, it can be prevented that the pitch of the process-waving is coincident in length with the ball-to-ball distance. Accordingly, it is prevented that the process-waving adversely affects the operation and the noise.

Figure 6:
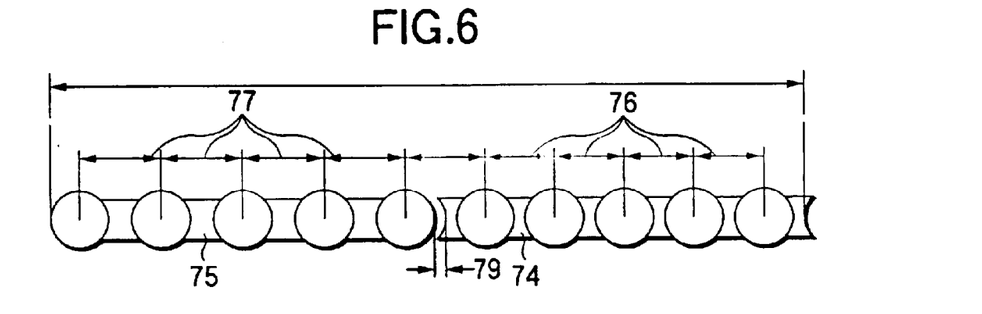
FIG. 6 is a diagram showing, in model form, an embodiment of the present invention having one of the advantageous features, which the embodiment is a ball screw in which retainer pieces having different thicknesses are alternately arranged.

In an embodiment shown in FIG. 6, as in the above embodiment, the retainer pieces 74 and 75 are arranged as in the above embodiment, however it is different from an arrangement of those retainer pieces 74 and 75, not alternately. As in this embodiment, balls may be arranged to have a part where only the retainer pieces 74 are arranged while spacing adjacent balls by a distance 76, and a part where only the retainer pieces 75 are arranged while spacing adjacent balls by a distance 77. In this case, a remaining gap 79 may be selected to have such a size as to prevent the retainer pieces from falling down. In design, there is no need of considering the filling factor of balls.

Figure 7A:
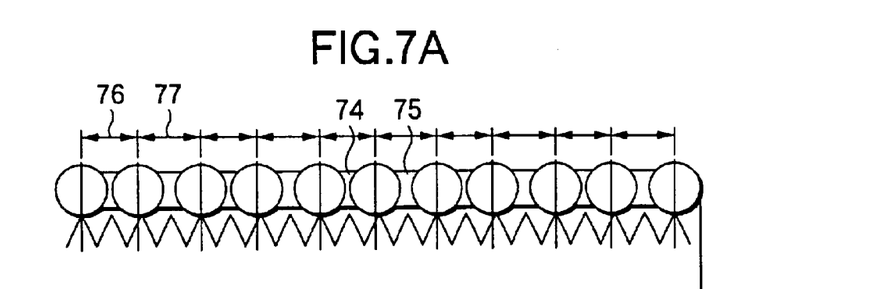
Figure 7B:
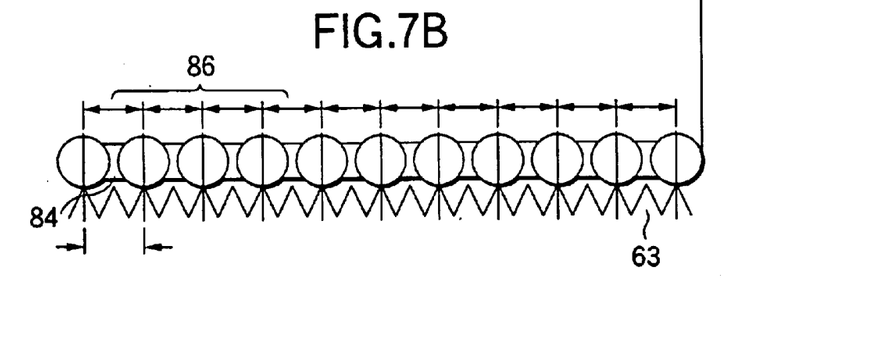

As shown in FIGS. 7A and 7B, in the case of the embodiment, the thickness of the retainer piece may be determined in the following manner. In FIG. 7B showing a related art, a distance between the center points of adjacent balls is a distance 86 when the pitch of the process-waving is coincident with the ball-to-ball distance. Let us consider a case where two kinds of retainer pieces 74 and 75 having different thicknesses are prepared (FIG. 7A). It is assumed that the center-to-center distances between adjacent balls when the retainer pieces 74 and 75 are applied to the ball array are a distance 76 and a distance 77, respectively. The distances 76 and 77 are determined so that 2×(distance 86)=(distance 76)+(distance 77) holds among 2×(distance 86) as a distance two times as long as the related ball-to-ball distance 86, (distance 76) and (distance 77).

Further, the thicknesses of the distance 74 and the distance 75 are determined so as to correspond to those distances.

Figure 8A:
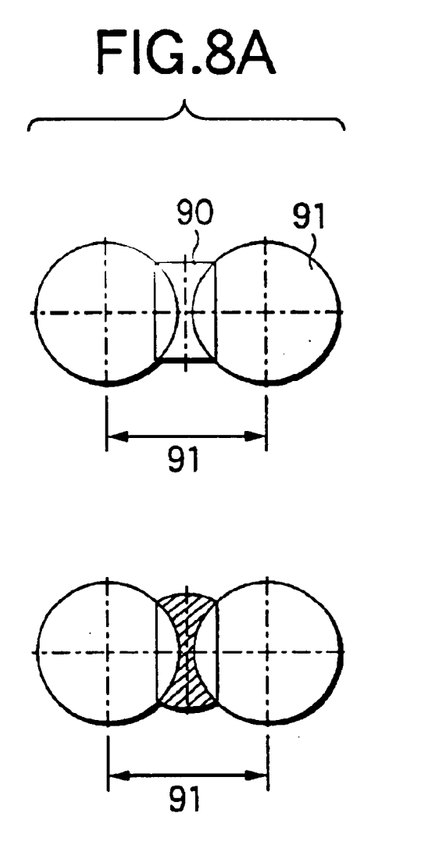
Figure 8B:
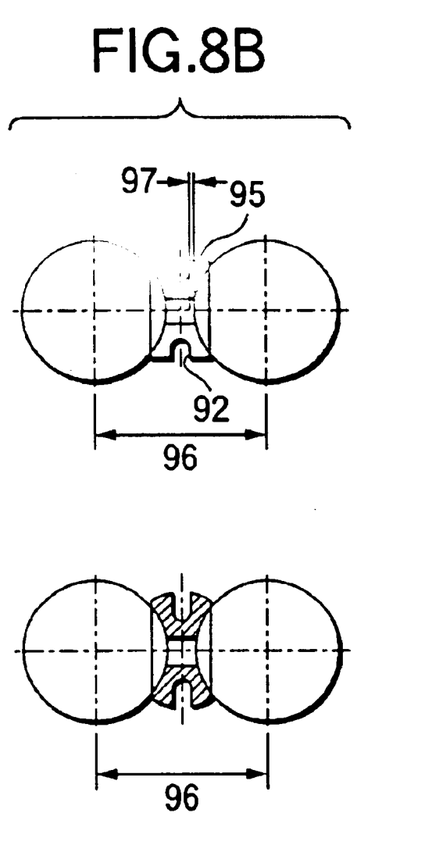

Another embodiment of the present invention is an embodiment handling the details of a retainer piece 90 to be arranged. A related retainer piece 90, as shown in FIG. 8A, has concave surfaces each configured so as to conform to the outer peripheral surface of a ball 91. The ball-to-ball distances 91 are almost equal to one another. However, by forming, for example, a slit 92 in the retainer piece 95 and giving an elastic property to the retainer piece, as in an embodiment shown in FIG. 8B, a ball-to-ball distance 96 is varied by an amount of compression thickness 97 (one side) by the pressures of the balls which mutually act. This feature increases the freedom of selection of the ball-to-ball distance. As shown in FIG. 8B, the retainer piece is made of metal material, and is designed to have a structure having a slit 92, thereby making the structure elastic. In an alternative, the retainer piece is made of elastic material, such as plastics or hard rubber, whereby elasticity is given to the retainer piece.

In the embodiments mentioned above, two kinds of retainer pieces are used. If required, three or more kinds of retainer pieces having different thicknesses may be used instead.

As seen from the foregoing description, in the linear motion device, there is no need of using many kinds of retainer pieces when those pieces are each assembled to between adjacent rolling elements. Therefore, the linear motion device is capable of reducing the vibrations and noises, which are ascribed to the periodical passing vibration of the rolling elements, without increasing the cost.

By arranging different retainer pieces, the number of parts where the pitch of process-waving is coincident with the ball-to-ball distance is reduced. Therefore, the operation performance is enhanced, and the noise generation is prevented.

Further, the freedom of selection of retainer pieces is large, there is no need of considering the process-waving as a precondition for design, and the fitting rate of balls may easily be changed. In other words, the part where the pitch of the process-waving coincides with the ball-to-ball distance may easily be adjusted without changing the filling factor of balls.

While only certain embodiments of the invention have been specifically described herein, it will apparent that numerous modifications may be made thereto without departing from the spirit and scope of the invention.

What is claimed is:

1. A linear motion guide bearing device comprising:
a guide rail having rolling grooves extending in an axial direction of the linear motion guide bearing device and formed on the outer surface thereof;
a slider engaged with the guide rail so as to move in the axial direction of the guide rail;
a plurality of rolling elements interposed between the slider and the rolling grooves of the guide rail so as to define a rolling element series; and
a plurality of retainer pieces each interposed between adjacent rolling elements, the retainer pieces including a plurality of kinds of retainer pieces having different thicknesses, wherein a number of kinds of the retainer pieces is more than three and is smaller than the number of the rolling elements of the rolling element series.

2. The linear motion guide bearing device according to claim 1, wherein the number of kinds of retainer pieces is three to five kinds of retainer pieces.

3. The linear motion guide bearing device according to claim 1, wherein the retainer pieces are differently colored for each of the kinds of retainer pieces having different thicknesses.

4. The linear motion guide bearing device according to claim 1, wherein each retainer piece has an identifying mark so as to distinguish the kinds of retainer pieces.

5. A ball screw device comprising:
a screw shaft having a first thread groove spirally formed in an outer peripheral surface thereof;
a nut having a second thread groove in the inner peripheral surface thereof and being fitted to the screw shaft, the second thread groove corresponding to the first thread groove of the screw shaft;
a plurality of rolling element rollably received in a space defined between the first and second thread grooves so as to define a rolling element series;
a circulating member fixed to the nut so as to form a circulating passage through which the rolling elements rolling along the space defined between the first and second thread grooves endlessly circulate; and
a plurality of retainer pieces each interposed between adjacent rolling elements, the retainer pieces including a plurality of kinds of retainer pieces having different thicknesses, wherein a number of kinds of the retainer pieces is more than three and is smaller than the number of the rolling elements of the rolling element series.

6. The ball screw device according to claim 5, wherein the number of kinds of retainer pieces is three to five kinds of retainer pieces.

7. The ball screw device according to claim 5, wherein the retainer pieces are differently colored for each of the kinds of retainer pieces having different thicknesses.

8. The ball screw device according to claim 5, wherein each retainer piece has an identifying mark so as to distinguish the kinds of retainer pieces.

9. The ball screw according to claim 5, wherein each of the retainer pieces has an elastic structure or is made of elastic material.

10. A method of controlling a distance of the center-to-center distance between adjacent balls or a number of balls in a given length rolling element series by making different, thicknesses of retainer pieces located between adjacent balls, wherein a number of kinds of retainer pieces of different thickness is more than three and is smaller than the number of balls in the rolling element series.

* * * * *